(12) United States Patent
Lehotay et al.

(10) Patent No.: US 9,675,211 B2
(45) Date of Patent: Jun. 13, 2017

(54) NO-BEAN DETECTION FOR COFFEE BEAN GRINDER

(71) Applicant: Helen of Troy Limited, Belleville, St. Michael (BB)

(72) Inventors: Adam John Lehotay, New York, NY (US); Alan Varr Laursen, New York, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 348 days.

(21) Appl. No.: 14/640,870

(22) Filed: Mar. 6, 2015

(65) Prior Publication Data

US 2016/0256001 A1   Sep. 8, 2016

(51) Int. Cl.
*A47J 42/44* (2006.01)
*A47J 42/50* (2006.01)
*A47J 42/56* (2006.01)

(52) U.S. Cl.
CPC .............. *A47J 42/44* (2013.01); *A47J 42/50* (2013.01); *A47J 42/56* (2013.01)

(58) Field of Classification Search
CPC ............. A47J 42/44; A47J 42/56; A47J 42/50
See application file for complete search history.

(56) References Cited

U.S. PATENT DOCUMENTS

| | | | |
|---|---|---|---|
| 4,066,245 A | 1/1978 | Shultz | |
| 4,967,648 A | 11/1990 | Helbling | |
| 5,287,795 A | 2/1994 | Enomoto | |
| 5,386,944 A | 2/1995 | Knepler et al. | |
| 5,522,556 A | 6/1996 | Knepler | |
| 6,155,158 A | 12/2000 | Anson | |
| 6,321,506 B1 | 11/2001 | Rolland | |
| 6,783,089 B2 | 8/2004 | Lassota | |
| 7,934,670 B2 | 5/2011 | Ford | |
| 8,096,229 B2 | 1/2012 | Keller | |
| 8,179,072 B2 | 5/2012 | Beule et al. | |
| 8,272,586 B2 | 9/2012 | Bolognesi | |
| 2009/0056554 A1 | 3/2009 | Beule | |
| 2011/0155829 A1 | 6/2011 | Wuthrich | |
| 2012/0132735 A1 | 5/2012 | Keller | |
| 2014/0123857 A1 | 5/2014 | Rego | |

FOREIGN PATENT DOCUMENTS

GB   2463900   3/2010
JP   H06133879   5/1994

OTHER PUBLICATIONS

International Search Report filed in PCT/US16/20538 mailed Apr. 29, 2016.

*Primary Examiner* — Mark Rosenbaum
(74) *Attorney, Agent, or Firm* — Rankin, Hill & Clark LLP

(57) ABSTRACT

A method for detecting a state of a coffee bean grinder includes providing a supply voltage to a motor of a grinding apparatus, and monitoring with a motor stall detection sensor at least one operating parameter of the motor. The method further includes determining whether a motor stall has been detected based on monitoring the at least one operating parameter. The method also includes measuring using a weight sensor a weight of coffee grounds that have been ground by the grinding apparatus, and determining that no beans are present in a hopper that feeds coffee beans to the grinding apparatus when no motor stall has been detected and no change in weight has been detected at the weight sensor for a predetermined amount of time. A coffee bean grinder is also disclosed.

15 Claims, 2 Drawing Sheets

NO-BEAN DETECTION FOR COFFEE BEAN GRINDER

BACKGROUND

Coffee bean grinders typically include a hopper in which coffee beans are placed to be delivered to a grinding apparatus. The grinding apparatus grinds the coffee beans and delivers ground coffee beans to a receptacle. The receptacle can be part of a coffee brewing machine such that the receptacle is a brew basket or similar receptacle. Coffee bean grinders can also be made separately from the coffee brewing machine where the ground coffee is taken from the receptacle and poured into a brew basket.

The lack of coffee beans in the hopper of the coffee bean grinder should be detected as soon as possible. If the lack of coffee beans is not detected in time, a motor that is part of the grinding apparatus could overheat if it runs under no load conditions for an extended period of time. Some known coffee bean grinders stop running the motor either at the time that a desired amount (e.g., weight) of coffee has been ground or upon detecting that no coffee beans are in the hopper any longer.

Weight sensors have been used to determine that the desired amount of coffee beans has been ground. For example, one known coffee bean grinder includes a control circuit having a selector for selecting a desired weight of ground coffee to be produced. A weight sensor positioned beneath a receptacle repeatedly weighs the ground coffee accumulating in the receptacle and transmits the actual weight signal to the control circuit. The actual weight is then compared to the selected weight of ground coffee to be produced, and the control circuit stops the grinding mechanism when the measured weight equals the selected weight. There is no mention, however, of stopping the motor when there are no coffee beans in a hopper that feeds the grinding mechanism of the coffee bean grinder.

The detection of a lack of coffee beans in the hopper of a coffee bean grinder has been performed through using optical sensors positioned within the hopper. These optical sensors, however, can be covered with dust as the coffee bean grinder is used more and more often. Other known coffee bean grinders monitor the electrical current running through the motor and conclude from the magnitude of the current drawn by the motor the absence of coffee beans in the hopper. The problem with this method of detection is that if one of the gears in the grinding mechanism becomes stuck and an output shaft of the electrical motor no longer rotates, the magnitude of the current drawn by the motor could increase and lead to a conclusion that the hopper is empty when in fact it is the motor that is stalled.

SUMMARY

In view of the foregoing, a method for detecting a state of a coffee bean grinder is provided. The method includes providing a supply voltage to a motor of a grinding apparatus of the coffee bean grinder, and monitoring with a motor stall detection sensor at least one operating parameter of the motor. The method further includes determining whether a motor stall has been detected based on monitoring with the motor stall detection sensor the at least one operating parameter of the motor. The method also includes measuring using a weight sensor a weight of coffee grounds that have been ground by the grinding apparatus, and determining that no beans are present in a hopper that feeds coffee beans to the grinding apparatus when no motor stall has been detected and no change in weight has been detected at the weight sensor for a predetermined amount of time.

An example of a coffee bean grinder includes a grinding apparatus, a hopper, a weight sensor, a motor stall detection sensor, a user interface, and a controller. The grinding apparatus includes a motor having an output shaft operatively connected with the grinding mechanism. The hopper is arranged with respect to the grinding apparatus for feeding coffee beans to the grinding apparatus. The weight sensor is arranged with respect to the grinding apparatus such that coffee beans that have been ground by the grinding apparatus are delivered toward the weight sensor to be weighed by the weight sensor. The motor stall detection sensor is associated with the motor for monitoring an operating parameter of the motor. The user interface includes a display. The controller is an electrical communication with the motor, the weight sensor, the motor stall detection sensor and the user interface. The controller is programmed to determine a motor stall condition based on signals received from the motor stall detection sensor. The controller is programmed to determine a NO BEANS state indicating that no beans are present in the hopper when no motor stall condition has been detected and no change in weight has been detected at the weight sensor for a predetermined duration of time.

DETAILED DESCRIPTION

Figure 1:
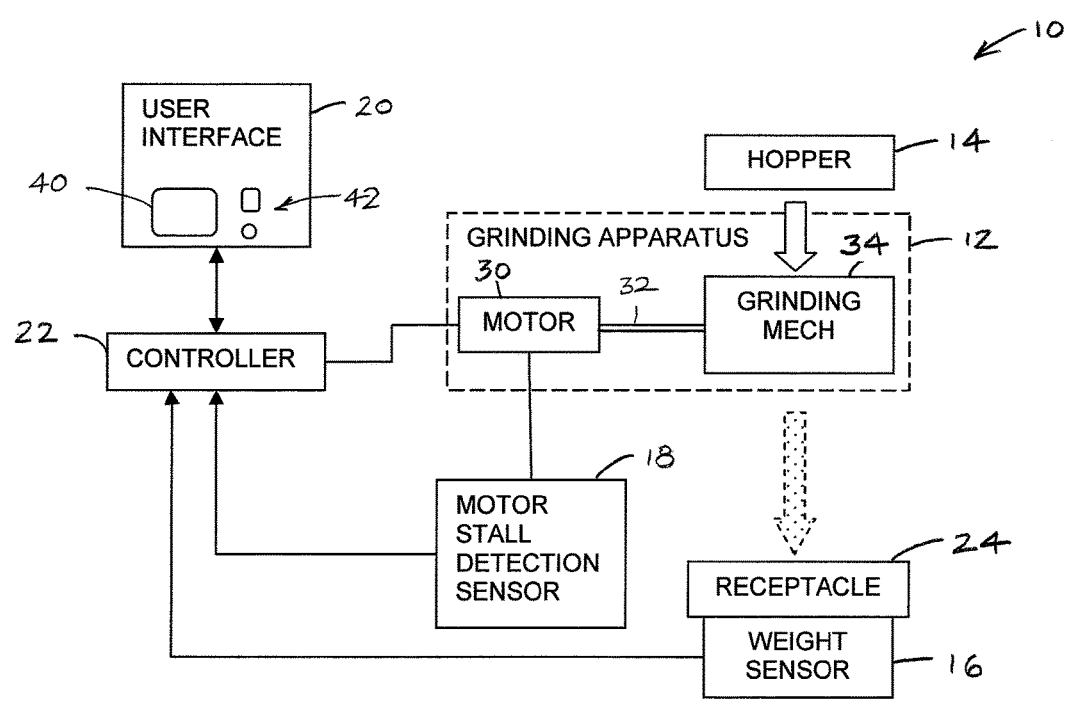
FIG. 1 is a schematic depiction of a coffee bean grinder.

FIG. 1 schematically depicts a coffee bean grinder 10 including a grinding apparatus 12, a hopper 14, a weight sensor 16, a motor stall detection sensor 18, a user interface 20, a controller 22, and a receptacle 24. The coffee bean grinder 10 is designed to reduce the amount of time that the grinding apparatus 12 operates when the hopper 14 has no beans in it.

The grinding apparatus 12 includes a motor 30 having an output shaft 32 operatively connected with a grinding mechanism 34. The motor 30 receives electrical power from an electrical power source (not shown), and the flow of power to the motor 30 is controlled by the controller 22. The grinding mechanism 34 can include burrs, grinding wheels or another type of known mechanism that can be used to grind coffee beans to a desired powder-like substance. Typically, one burr is driven by the motor 30 and another burr or grinding wheel is stationary with respect to the moving burr. A gearbox or other type of transmission can be disposed between the motor and the burr similar to known coffee bean grinders.

The hopper 14 is arranged with respect to the grinding apparatus 12 for feeding coffee beans to the grinding apparatus. In the illustrated embodiment, the hopper 14 is positioned vertically above the grinding apparatus 12 so that coffee beans can be fed by gravity from the hopper 14 to the grinding apparatus 12. Unlike known coffee bean grinders that use an optical sensor to detect whether coffee beans remain in the hopper, the hopper 14 in the illustrated embodiment can be devoid of any optical sensors.

The weight sensor 16 is arranged with respect to the grinding apparatus 12 such that coffee beans that have been ground by the grinding apparatus 12 are delivered toward the weight sensor 16 to be weighed by the weight sensor 16.

FIG. 1 also depicts that the receptacle 24 can be arranged with respect to the grinding apparatus 12 such that the coffee beans that have been ground by the grinding apparatus 12 are delivered to the receptacle 24. The receptacle 24 can collect the ground coffee beans from the grinding apparatus 12 and the weight sensor 16 can weigh the receptacle 24 and the ground coffee beans therein. The weight sensor 16 can be a load cell disposed beneath the receptacle 24; however, other known types of weight sensors can be employed.

The motor stall detection sensor 18 is associated with the motor 30 for monitoring at least one operating parameter of the motor 30. In one example, the motor stall detection sensor 18 is a current sensor that monitors current running through the motor 30. In an alternative embodiment, the motor stall detection sensor 18 can include a Hall-effect sensor configured to detect RPM of the output shaft 32 of the motor 30.

The user interface 20 is provided on an exterior of the coffee bean grinder 10 so as to be viewable by an operator of the coffee bean grinder 10. The user interface 20 includes a display 40 for displaying information to a user of the coffee bean grinder 10. The user interface 20 also includes user input devices 42, such as a button, a selector knob, a click wheel, or other similar device, that can be pressed, touched or manipulated by a user to input commands to the coffee bean grinder 10 through the user interface 20.

The controller 22 is in electrical communication with the motor 30, the weight sensor 16, the motor stall detection sensor 18, and the user interface 20. The controller 22 is programmed to determine a motor stall condition based on signals received from the motor stall detection sensor 18. The controller 22 is also programmed to control the display 40. More specifically, the controller 22 is programmed to control the display 40 to display an indication that no beans are present in the hopper 14 when no motor stall condition has been detected and no change in weight has been detected at the weight sensor 16 for a predetermined duration of time.

Figure 2:
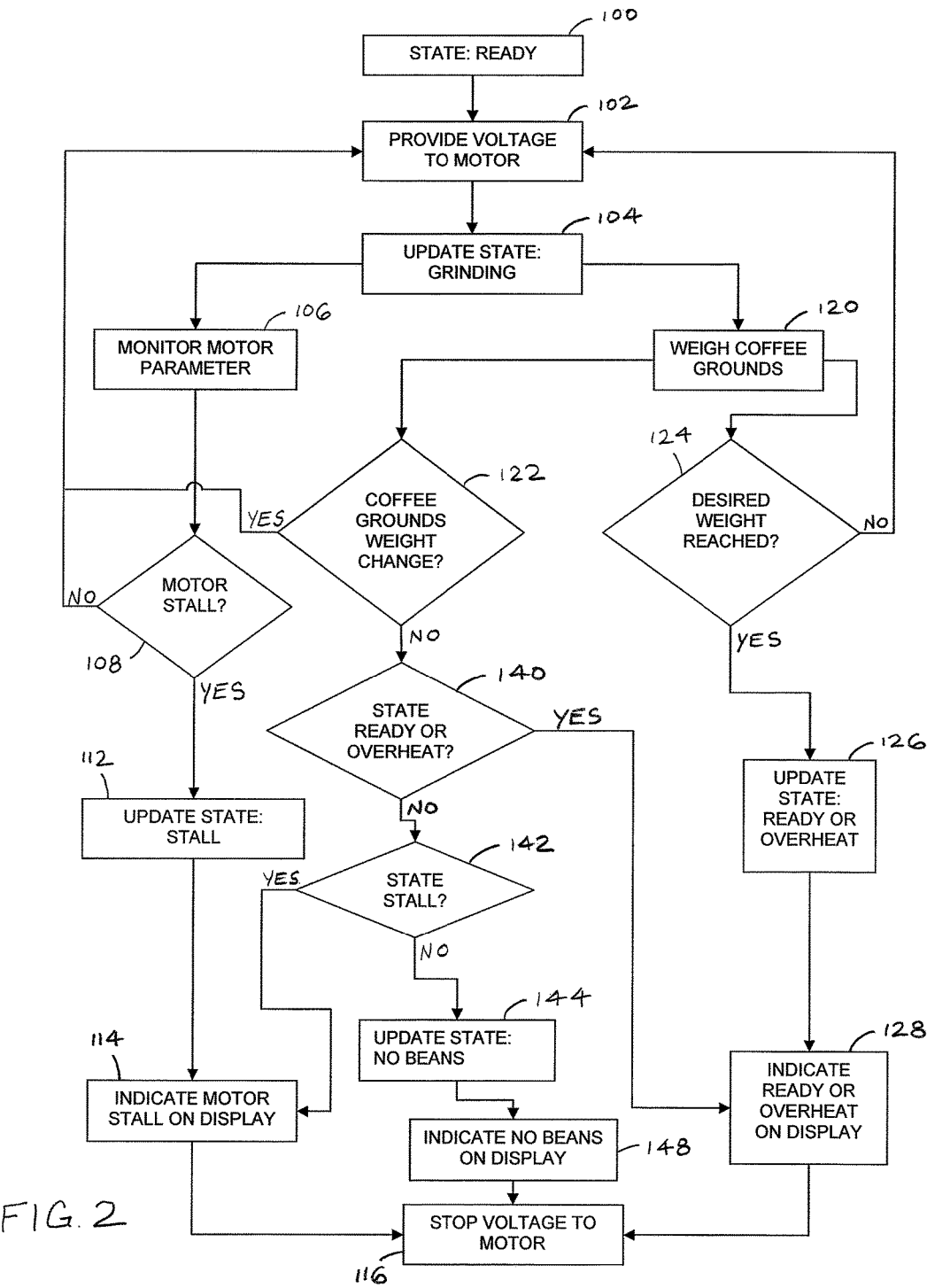
FIG. 2 is a flow diagram depicting a method for detecting a state of a coffee bean grinder.

A method for detecting a state of a coffee bean grinder, such as the coffee bean grinder 10 depicted in FIG. 1, will be described with reference to FIG. 2. Even though FIG. 2 depicts particular steps in a particular order, the order of operation of the steps can be changed. Moreover, some steps may be performed simultaneously with other steps. Even though the steps will be explained in a logical order, this should not be taken to limit the order in which the steps must be performed.

The coffee bean grinder 10 is configured to operate in different states. These states include a SLEEP state, a READY state, a GRINDING state, a NO BEANS state, a STALL state, and an OVERHEAT state. The controller 22 continuously monitors the state of the coffee bean grinder 10. The SLEEP state is entered after a predetermined amount of time of uninterrupted presence in either the READY state or the NO BEANS state. The SLEEP state is a power saving mode in which certain areas of the user interface 20 may no longer be illuminated. The coffee bean grinder 10 enters the READY state when an appropriate user input device 42 on the user interface 20 is pressed, touched or activated while the coffee bean grinder 10 is in the SLEEP state. In the READY state, the coffee bean grinder 10 can be programmed through the user interface 20 communicating with the controller 22. All of the features that can be programmed into the coffee bean grinder 10 will not be described in detail since they are not relevant to determining whether coffee beans remain in the hopper 14. The coffee bean grinder 10 can also enter the READY state under circumstances that will be described in more detail below.

The coffee bean grinder is in the GRINDING state when the motor 30 of the grinding apparatus 12 is operating. The coffee bean grinder 10 enters the NO BEANS state and the STALL state upon the occurrence of certain conditions that will be described in more detail below. The OVERHEAT state is entered after the GRINDING state when the run time of the motor 30 is long enough that overheating may be of concern. During the OVERHEAT state, the motor 30 is OFF and cannot be turned ON until after a predetermined amount of time has elapsed, which allows for the motor 30 to appropriately cool.

The method for detecting a state of the coffee bean grinder will begin with the coffee bean grinder 10 in the READY state at step 100. At step 102, voltage is provided to the motor 30 from the power source (not shown). This typically occurs when an operator depresses an appropriate user input device 42 on the user interface 20 to start grinding coffee beans. While voltage is being provided to the motor 30, the state of the coffee bean grinder 10 updates to the GRINDING state at step 104. The controller 22 continuously monitors and updates the state of the coffee bean grinder 10. When in the GRINDING state, at step 106, the motor stall detection sensor 18 monitors at least one operating parameter of the motor 30. As mentioned above, the motor stall detection sensor 18 can be a current sensor. In this example, the operating parameter that is being monitored is current running through the motor 30. When the current draw through the motor 30 is much greater than a typical current draw, this indicates that the motor 30 is stalled. In another example, the motor stall detection sensor 18 is configured to detect RPM of the output shaft 32 of the motor 30. In this instance, the operating parameter that is being monitored is the RPM of the output shaft 32. When the RPM of the output shaft falls below a threshold (typically near zero), this provides an indication that the motor 30 is stalled.

At step 108, the controller 22 can determine whether a motor stall has been detected based on monitoring with the motor stall detection sensor 18, the operating parameter, e.g. the current drawn through the motor 30 or the RPM of the output shaft 32. If no motor stall is detected at step 108, then the method reverts back to providing voltage to the motor 30 at step 102. If a motor stall is detected at step 108, the state of the coffee bean grinder 10 is updated to the STALL state at step 112, and the controller 22 controls the display 40 to display an indication that a motor stall has occurred at step 114. The controller 22 then stops voltage to the motor 30, at step 116, thus protecting the motor 30 and any fuse between the power source and the motor 30.

With reference back to step 104, also during the GRINDING state, in addition to monitoring the operating parameter of the motor, at step 106, the weight of the coffee grounds that have been ground by the grinding apparatus 12 is monitored at step 120. This can be performed by measuring using the weight sensor 16 the weight of coffee grounds that have been ground by the grinding apparatus 12. The weight sensor 16 can be a load cell disposed beneath the receptacle 24 that collects the coffee grounds that have been ground by the grinding apparatus 12.

Monitoring the weight of the coffee grounds can include determining whether the coffee grounds weight has changed over a predetermined amount of time at step 122 and determining whether a desired weight of coffee grounds has been reached at step 124. If at step 122 the coffee grounds weight has changed over a predetermined amount of time, e.g. one second, then this can be an indication that beans are still in the hopper 14 and being provided to the grinding apparatus 12. As such, the method can revert back to step 102 and provide voltage to the motor 30 and continue in the GRINDING state.

The coffee bean grinder 10 can also be configured to allow a user to input the desired amount of coffee to be ground. For example, the hopper 14 could be configured to store enough coffee beans to grind enough coffee beans to brew up to 12 cups of brewed coffee. However, an operator of the coffee bean grinder 10 may only desire four cups of coffee. The operator could then enter through the user interface 20 the desired number of cups of coffee, and the controller 22 is configured to determine the mass or weight of ground coffee beans to produce the desired number of cups of brewed coffee. As such, at step 120, while monitoring the weight of the coffee grounds, as the weight of the coffee grounds is measured using the weight sensor 16, the actual weight being detected at the weight sensor 16 can be compared to the desired weight, which was chosen based on the input from the user, to determine whether enough coffee has been ground. The desired weight can also be set to a default desired weight, if none is entered by a user of the coffee bean grinder 10. If the desired weight has not been reached, at step 124, then the grinding operation continues and reverts back to step 102 so that voltage is provided to the motor 30 and the state of the coffee bean grinder 10 remains in the GRINDING state at step 104 If the desired weight has been reached at step 124, then the state of the coffee bean grinder 10 is updated to the READY state or the OVERHEAT state at step 126, an indication can be provided on the display, at step 128, to indicate that the coffee bean grinder is in the READY (or OVERHEAT) state, and then voltage can be stopped to the motor at step 116. If the motor 30 runs long enough in the GRINDING state that overheating may be a concern, then the coffee bean grinder 10 can enter the OVERHEAT state instead of the READY state.

With reference back to step 122, if the coffee grounds weight does not change over a predetermined amount of time, then the controller 22 checks the state of the coffee bean grinder 10 at steps 140 and 142. As discussed above, if the desired weight has been reached at step 124, then the state of the coffee maker moves from the GRINDING state to the READY or the OVERHEAT state. If the coffee grounds weight at the weight sensor 16 does not change, it could be because the desired weight was reached at step 124, the motor 30 has stalled, or the hopper 14 is no longer delivering beans to the grinding apparatus, i.e., the hopper 14 is empty. By checking to see whether the coffee bean grinder 10 is in the READY state or the OVERHEAT state, this can check whether the desired weight of coffee grounds has been reached. As such, at step 140, the controller 22 determines whether the coffee bean grinder 10 is in the READY state or the OVERHEAT state, which would be an indication as to whether or not the desired weight of coffee grounds in the receptacle 24 has been reached. If the coffee bean grinder 10 is in the READY state or the OVERHEAT state, this is an indication that the desired weight has been reached. The controller 22 would then control the display 40 to display an indication that the coffee bean grinder 10 is in the READY state or the OVERHEAT state at step 128. If the motor 30 runs long enough in the GRINDING state that overheating may be a concern, then the coffee bean grinder 10 can enter the OVERHEAT and the controller 22 can control the display 40 to provide such an indication. If, however, at step 140 the controller 22 determines that the coffee bean grinder 10 is not in the READY state or the OVERHEAT state, then this is taken as an indication that the desired weight has not been reached. As such, it must be determined whether the coffee grounds weight has not changed at step 122 because either the hopper 14 is no longer delivering coffee beans to the grinding apparatus 12 because it is empty, or the motor 30 has stalled, for example by having a coffee bean caught in the grinding mechanism 34.

At step 142, the controller 22 determines whether the coffee bean grinder 10 is in the STALL state. If the coffee bean grinder 10 is in the STALL state, then the display 40 can indicate a motor stall at step 114. If however, at step 144, the controller 22 determines that the coffee bean grinder 10 is not in the STALL state, then the controller 22 updates the state of the coffee bean grinder 10 to the NO BEANS state at step 144. A determination of a NO BEANS state indicates that no beans are present in the hopper 14 that feeds coffee beans to the grinding apparatus 12. As such, at step 148, the controller 22 can control the display 40 to indicate no beans are in the hopper 14, which can be a different indication than the motor stall indication at step 114, and the ready indication at step 128. Voltage can be stopped to the motor at step 116.

A coffee bean grinder and a method for detecting the state of a coffee bean grinder has been described above with particularity. Modifications and alterations will occur to those upon reading and understanding the preceding detailed description. The invention, however, is not limited to only the embodiments described above. Instead, the invention is broadly defined by the appended claims and the equivalents thereof. It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for detecting a state of a coffee bean grinder, the method comprising:
   providing a supply voltage to a motor of a grinding apparatus;
   monitoring with a motor stall detection sensor at least one operating parameter of the motor;
   determining whether a motor stall has been detected based on monitoring with the motor stall detection sensor the at least one operating parameter of the motor;
   measuring using a weight sensor a weight of coffee grounds that have been ground by the grinding apparatus;
   determining that no beans are present in a hopper that feeds coffee beans to the grinding apparatus when no motor stall has been detected and no change in weight has been detected at the weight sensor for a predetermined amount of time.

2. The method of claim 1, wherein the motor stall detection sensor is a current sensor and the at least one operating parameter is current running through the motor.

3. The method of claim 1, wherein the motor stall detection sensor is configured to detect RPM of an output shaft of the motor, and the at least one operating parameter is the RPM of the output shaft.

4. The method of claim 1, wherein the weight sensor is a load cell disposed beneath a receptacle that collects the coffee grounds that have been ground by the grinding apparatus.

5. The method of claim 1, further comprising:
  determining whether a desired weight of coffee grounds has been reached based on measuring using the weight sensor the weight of coffee grounds that have been ground by the grinding apparatus; and
  determining that no beans are present in the hopper is further based on determining that the desired weight has not been reached.

6. The method of claim 5, wherein the desired weight defaults to a predetermined desired weight if no desired weight is entered through a user interface of the coffee bean grinder.

7. The method of claim 1, further comprising providing a first indication on a display of the coffee bean grinder upon determining that no beans are present in the hopper and providing a second indication, which is different than the first indication, on the display when a motor stall is determined.

8. The method of claim 1, further comprising stopping the supply voltage to the motor upon determining that no beans are present in the hopper.

9. A coffee bean grinder comprising:
  a grinding apparatus including a motor having an output shaft operatively connected with a grinding mechanism;
  a hopper arranged with respect to the grinding apparatus for feeding coffee beans to the grinding apparatus;
  a weight sensor arranged with respect to the grinding apparatus such that coffee beans that have been ground by the grinding apparatus are delivered toward the weight sensor to be weighed by the weight sensor;
  a motor stall detection sensor associated with the motor for monitoring an operating parameter of the motor;
  a user interface including a display; and
  a controller in electrical communication with the motor, the weight sensor, the motor stall detection sensor and the user interface,
  wherein the controller is programmed to determine a motor stall condition based on signals received from the motor stall detection sensor,
  wherein the controller is programmed to determine a NO BEANS state indicating that no beans are present in the hopper when no motor stall condition has been detected and no change in weight has been detected at the weight sensor for a predetermined duration of time.

10. The coffee bean grinder of claim 9, wherein the controller is programmed to control the display to display a first indication when the NO BEANS state is determined, and the controller is programmed to control the display to display a second indication, which is different from the first indication, when the motor stall condition has been detected.

11. The coffee bean grinder of claim 9, wherein the grinding mechanism includes a burr of a grinding wheel operatively connected with the output shaft.

12. The coffee bean grinder of claim 9, wherein the motor stall detection sensor is a current sensor.

13. The coffee bean grinder of claim 9, wherein the motor stall detection sensor includes a Hall-effect sensor configured to detect RPM of the output shaft of the motor.

14. The coffee bean grinder of claim 9, further comprising a receptacle arranged with respect to the grinding apparatus such that the coffee beans that have been ground by the grinding apparatus are delivered to the receptacle, and the weight sensor is a load cell disposed beneath the receptacle.

15. The coffee bean grinder of claim 9, wherein the controller is programmed to stop supplying voltage to the motor when the NO BEANS state is determined.

* * * * *